(12) United States Patent
Katou et al.

(10) Patent No.: US 7,215,244 B2
(45) Date of Patent: May 8, 2007

(54) TRANSMITTER FOR TIRE CONDITION MONITORING APPARATUS

(75) Inventors: Michiya Katou, Ichinomiya (JP); Takashi Ibuka, Gifu (JP)

(73) Assignee: Pacific Industrial Co., Ltd., Gifu-ken (JP)

( * ) Notice: Subject to any disclaimer, the term of this patent is extended or adjusted under 35 U.S.C. 154(b) by 177 days.

(21) Appl. No.: 11/051,083

(22) Filed: Feb. 4, 2005

(65) Prior Publication Data

US 2006/0006993 A1 Jan. 12, 2006

(30) Foreign Application Priority Data

Jul. 12, 2004 (JP) ............... 2004-204586

(51) Int. Cl.
*B60C 23/00* (2006.01)
(52) U.S. Cl. ............ 340/447; 340/442; 73/146.2
(58) Field of Classification Search ........... 340/447, 340/442; 73/146.2
See application file for complete search history.

(56) References Cited

U.S. PATENT DOCUMENTS 6,580,363 B1   6/2003   Wilson
6,919,799 B2 *  7/2005   Wilson et al. ............... 340/447
2004/0055371 A1  3/2004   Sanchez et al.

FOREIGN PATENT DOCUMENTS

DE   101 54 335 A1   5/2003
JP   2003-112506     4/2003

* cited by examiner

*Primary Examiner*—Daryl C Pope
(74) *Attorney, Agent, or Firm*—Crompton, Seager & Tufte, LLC

(57) ABSTRACT

A transmitter for a tire condition monitoring apparatus includes a pressure sensor for detecting of the internal pressure of a tire, a transmission circuit for generating a transmission signal, and a transmission antenna for transmitting the transmission signal as a radio wave. The transmission antenna is a planar antenna and includes a plate-like transmission conductor for transmitting the radio wave. The transmission antenna is configured such that the radio wave transmitted from the transmission conductor becomes a circularly polarized wave. As a result, the transmitter has a superior transmission performance and a reduced size.

10 Claims, 4 Drawing Sheets

Transmission Circuit 33

Transmission Circuit 33

Transmission Circuit 33

Transmission Circuit 33

Transmission Circuit 33

TRANSMITTER FOR TIRE CONDITION MONITORING APPARATUS

BACKGROUND OF THE INVENTION

The present invention relates to a transmitter for a tire condition monitoring apparatus, more specifically, to a transmission antenna of a transmitter.

Wireless tire condition monitoring apparatuses that allow a driver in a vehicle passenger compartment to check the conditions of vehicle tires have been proposed. One such monitoring apparatus includes transmitters and a receiver. Each transmitter is attached to a vehicle wheel to be located in the corresponding tire, and the receiver is located in the body frame of the vehicle. Each transmitter detects the condition of the associated tire, such as the internal pressure and the internal temperature, and wirelessly transmits a signal including data that represents the detected tire condition as radio waves through a transmission antenna. The receiver receives the radio waves from the transmitter through a reception antenna, and displays the condition of the tire on a display located in the passenger compartment as necessary.

Each transmitter typically includes a circuit board on which electronic circuit is formed and a casing accommodating the circuit board. The electronic circuit includes electronic components mounted on the circuit board, such as a pressure sensor and a signal processing element (for example, refer to Japanese Laid-Open Patent Publication No. 2003-112506).

To enhance the transmission performance, it is preferable to use large transmission antennas with a maximized transmitting surface. However, the transmission antenna of the transmitter disclosed in the above prior art is typically a wire antenna that has relatively small transmitting surface and is attached to the front surface or the back surface of the circuit board. To increase the transmitting surface of the wire antenna, the length or the diameter of the antenna needs to be increased. This not only increases the size of the transmission antenna, but also increases the sizes of the circuit board and the casing. It is thus difficult to simultaneously reduce the size of the antenna and improve the transmission performance of the antenna.

SUMMARY OF THE INVENTION

Accordingly, it is an objective of the present invention to provide a transmitter for a tire condition monitoring apparatus, which transmitter has an improved transmission performance and a reduced size.

To achieve the foregoing and other objectives and in accordance with the purpose of the present invention, a transmitter for an apparatus for monitoring a condition of a tire of a vehicle is provided. The transmitter includes a tire condition sensor, a transmission circuit, and a transmission antenna. The tire condition sensor detects the condition of the tire. The transmission circuit generates a transmission signal containing data that represents the detected tire condition. The transmission antenna transmits the transmission signal as a radio wave. The transmission antenna is a planar antenna that includes a plate-like transmission conductor for transmitting the radio wave.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of the present invention will now be described with reference to the drawings.

Figure 1:
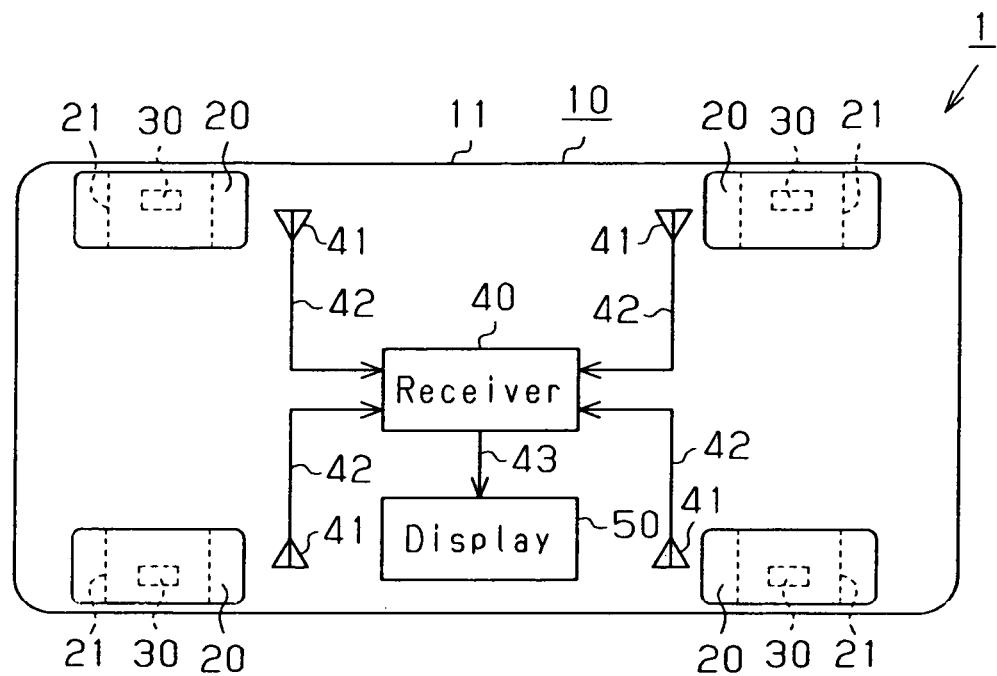
FIG. 1 is a diagrammatic view showing a tire condition monitoring apparatus according to one embodiment of the present invention.

As shown in FIG. 1, the tire condition monitoring apparatus 1 includes four transmitters 30 and a single receiver 40. Each of the transmitters 30 is associated with a different one of four tires 20 of a vehicle 10. The receiver 40 is installed in a body frame 11 of the vehicle 10.

Each transmitter 30 is located in the corresponding tire 20 and is fixed to a wheel 21 of the tire 20. Each transmitter 30 measures the condition of the corresponding tire 20, that is, the internal pressure of the tire 20, and then wirelessly transmits a signal containing air pressure data.

The receiver 40 is located at a predetermined position on the body frame 11 and is activated by electricity of a battery (not shown) of the vehicle 10. The receiver 40 is connected to four reception antennas 41 with cables 42. Each reception antenna 41 corresponds to one of the tires 20. Each reception antenna 41 is located in a portion of the vehicle body frame 11 that is close to the corresponding tire 20, for example, in a wheel well. The receiver 40 receives the signal wirelessly transmitted by each transmitter 30 through the corresponding reception antenna 41.

A display 50 is located in the view of the driver of the vehicle 10, for example, in the passenger compartment. The display 50 is connected to the receiver 40 with a cable 43.

Figure 2:
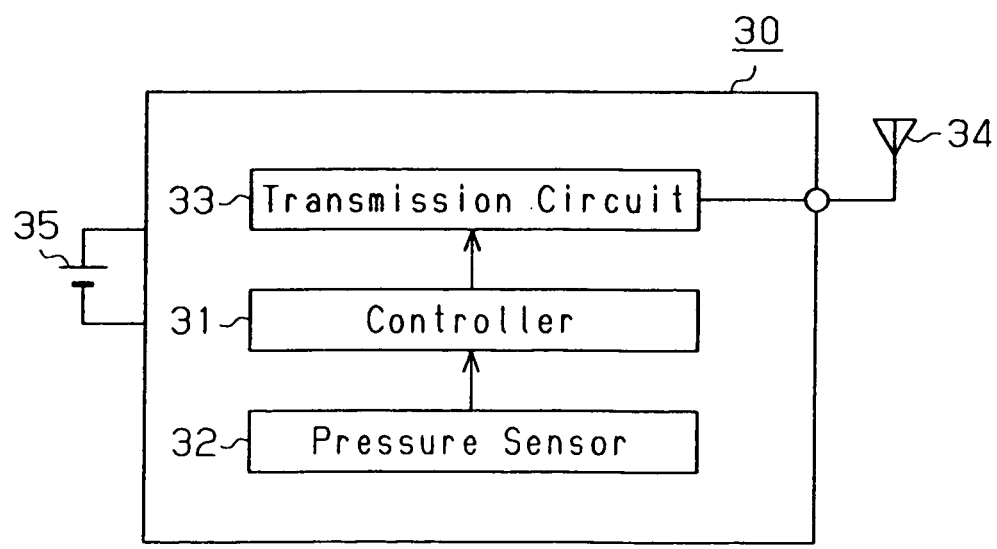
FIG. 2 is a block diagram showing a transmitter of the monitoring apparatus shown in FIG. 1.

As shown in FIG. 2, each transmitter 30 includes a controller 31, which is a microcomputer. The controller 31 includes, for example, a central processing unit (CPU), read only memory (ROM), and random access memory (RAM). A unique ID code is registered in an internal memory, for example, the ROM, of the controller 31. The ID code is used to distinguish the associated transmitter 30 from the other three transmitters 30.

Each tire pressure sensor 32, which functions as a tire condition sensor, measures the internal air pressure of the associated tire 20 and provides the controller 31 with pressure data, which is obtained from the measurement. The controller 31 sends data containing the air pressure data and the registered ID code to a transmission circuit 33. The transmission circuit 33 encodes and modulates the data sent from the controller 31, thereby generating a transmission signal. The transmission antenna 34 transmits the transmission signal as a radio wave. Each transmitter 30 is provided with a battery 35. The transmitter 30 is driven by electricity of the battery 35.

Figure 3A:
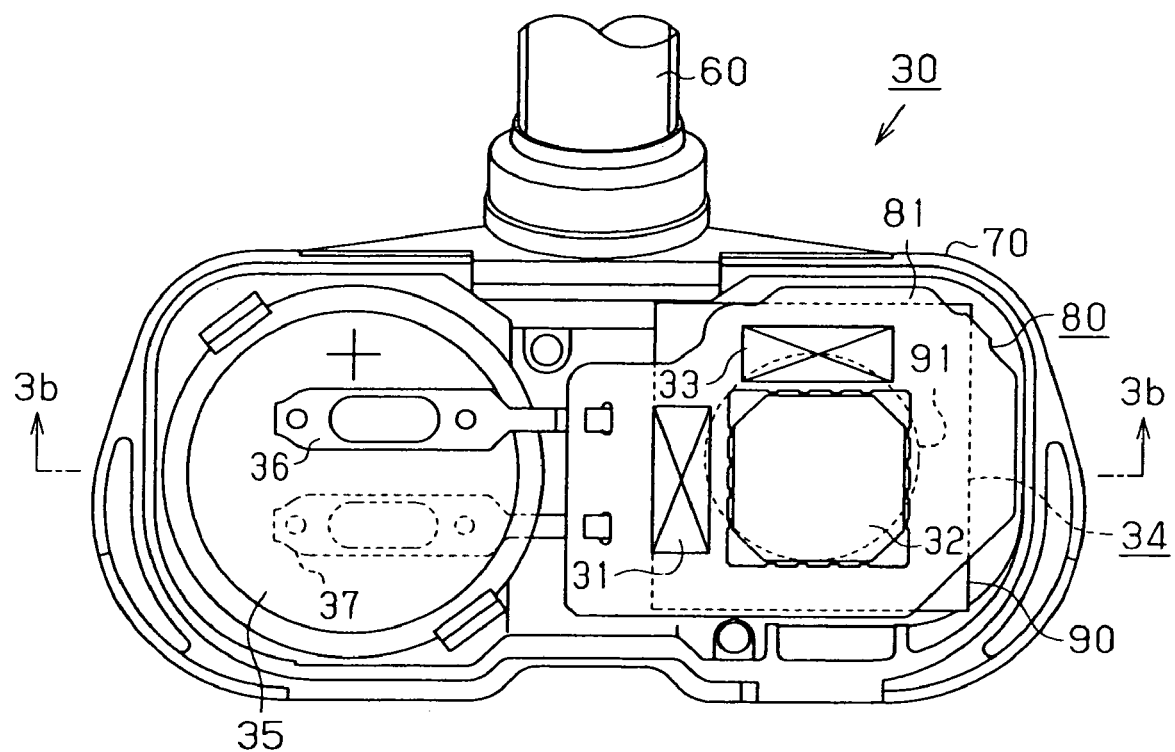
FIG. 3(a) is a front view illustrating the mechanical configuration of the transmitter shown in FIG. 2.
Figure 3B:
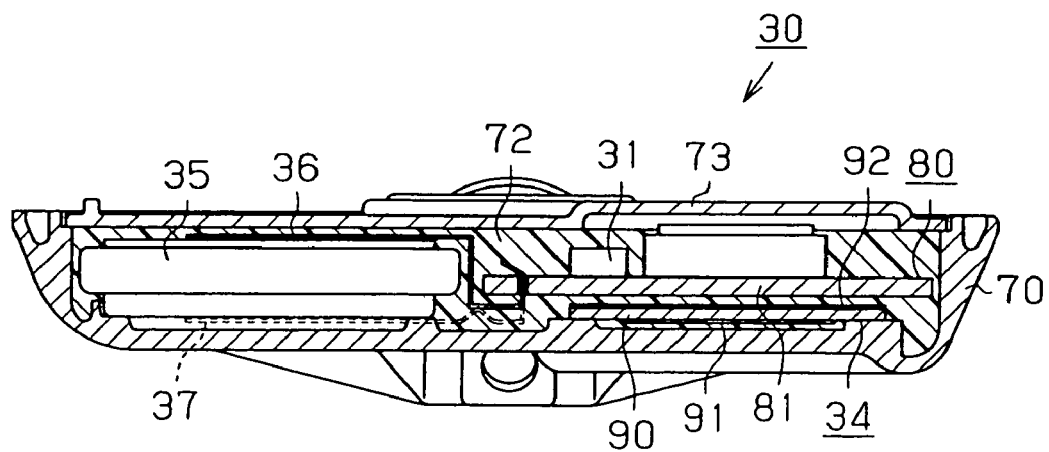
FIG. 3(b) is a cross-sectional view taken along line 3b—3b of FIG. 3(a)

As shown in FIGS. 3(a) and 3(b), the each transmitter 30 has a casing 70 having an opening and a valve stem 60 extending from the casing 70. The casing 70 is located inside the associated tire 20, while the valve stem 60 extends through the associated wheel 21 and protrudes to the outside of the tire 20. The valve stem 60 includes an internal air passage (not shown), through which air is supplied to the interior of the tire 20.

The casing 70 accommodates a circuit unit 80, the battery 35 that provides the circuit unit 80 with electricity, and the transmission antenna 34. The battery 35 is connected to the circuit unit 80 with a pair of terminal plates 36, 37. The circuit unit 80 includes a circuit board 81, electronic components mounted on the circuit board 81. The electronic components include the controller 31, the pressure sensor 32, and the transmission circuit 33, which are each formed as a chip.

Figure 4:
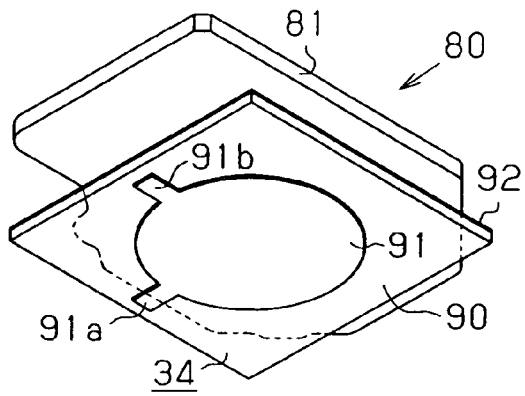
FIG. 4 is a perspective view illustrating a transmission antenna and a circuit unit.

As shown in FIGS. 3(a), 3(b), and 4, the transmission antenna 34 faces at predetermined distance a surface of the circuit substrate 81, which surface is opposite the surface on which the electronic components are mounted. The transmission antenna 34 is parallel to the circuit substrate 81. It is preferable to provide the circuit board 81 with protruding supporting members such as support legs with which the transmission antenna 34 is fixedly supported on the circuit board 81. That is, the transmission antenna 34 preferably forms part of the circuit unit 80.

The transmission antenna 34 is a planar antenna (also called patch antenna) and is configured to transmit circularly polarized waves. In accordance with the types of the transmission antenna 34, an antenna that is capable of receiving circularly polarized waves is used as the reception antenna 41. In this case, an antenna that has substantially the same configuration as the transmission antenna 34 may be used as the reception antenna 41.

Each transmission antenna 34 includes an antenna substrate 90, a transmission conductor 91 (transmission electrode) for transmitting the radio waves, and a grounding conductor (grounding electrode) 92. The antenna substrate 90 is a rectangular plate having a first surface facing away from the circuit board 81, and a second surface facing the circuit board 81. The transmission conductor 91 is a circular plate and is located on the first surface of the antenna substrate 90. The grounding conductor 92 is located on the second surface of the antenna substrate 90 to cover the entire second surface.

The antenna substrate 90 is formed of a dielectric (high dielectric), that is, a material having a relatively high dielectric constant. A dielectric has a property to shortens the wavelength of radio waves. When the dielectric constant of a dielectric is expressed by $\epsilon$, the wavelength of a radio wave is multiplied by the ratio of $1/\sqrt{\epsilon}$. That is, as the dielectric constant $\epsilon$ becomes greater, the wavelength of a radio wave is shortened. Therefore, if a material having a proper dielectric constant is used for the antenna substrate 90, the size of the transmission conductor 91 can be reduced.

Figure 5:
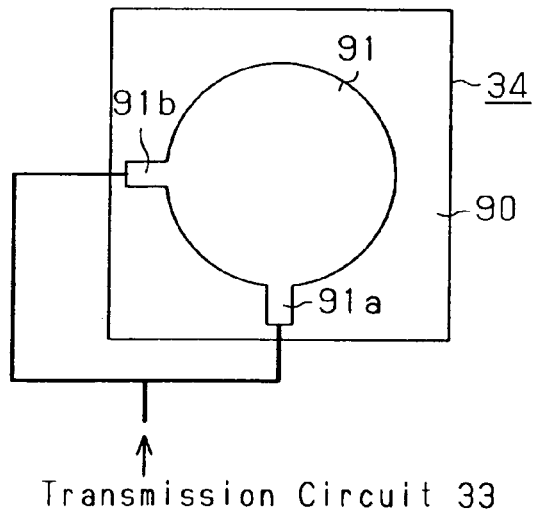
FIG. 5 is a plan view illustrating the transmission antenna.

To transmit circularly polarized wave from the transmission conductor 91, a two feeding point system is adopted in this embodiment. That is, as shown in FIGS. 4 and 5, a pair of feeder terminals (microstrip lines) 91a, 91b extend radially outward from the outer circumference of the transmission conductor 91. The feeder terminals 91a, 91b are separated by an angle of 90 degrees from each other. The feeder terminals 91a, 91b are connected to the transmission circuit 33. The transmission circuit 33 supplies electricity to the transmission conductor 91 through the feeder terminals 91a, 91b. That is, the transmission circuit 33 supplies transmission signals to the transmission conductor 91 through the feeder terminals 91a, 91b so that the transmission conductor 91 transmits radio waves. As described above, the transmitted radio waves are circularly polarized waves. A circularly polarized wave is the resultant of a vertically polarized wave and a horizontally polarized wave with a 90 degree phase difference. As the circularly polarized wave advances, the plane of polarization rotates. To generate such circularly polarized waves, the transmission circuit 33 has a phase control circuit (not shown) that adjusts the phase difference between transmission signals each supplied to either one of the feeder terminals 91a, 91b.

Although not illustrated, the grounding conductor 92 is connected to a grounding conductor of the circuit board 81 or to the grounding one of the feeder lines connected to the circuit unit 80.

As shown in FIGS. 3(a) and 3(b), the casing 70 is filled with potting material 72. The battery 35, the circuit unit 80, and the transmission antenna 34 in the casing 70 are covered with the potting material 72 except for the upper surface of the pressure sensor 32, which is a pressure sensing surface. The opening of the casing 70 is closed with a lid 73. A vent hole is formed in the lid 73 or between the lid 73 and the casing 70 to guide air in the tire 20 to the pressure sensing surface of the pressure sensor 32. In FIG. 3(a), the lid 73 and the potting material 72 are not shown.

Instead of using the potting material 72, the surfaces of the components in the casing 70 may be coated with a moisture-proof coating material.

Although not illustrated, when the transmitter 30 is attached to the wheel 21, the surface of the circuit board 81 to which the electronic components 31, 32, 33 are mounted faces the outer circumferential surface of the wheel 21. The transmission antenna 34 is arranged outside of the circuit unit 80 with respect to the radial direction of the wheel 21. The transmission conductor 91 of the transmission antenna 34, specifically, the transmitting surface of the transmission conductor 91, faces outward with respect to the radial direction of the wheel 21. The antenna substrate 90 formed of dielectric is located between the wheel 21 and the transmission conductor 91.

This embodiment provides the following advantages.

(1) The transmission antenna 34 is a planar antenna, and has the plate-like transmission conductor 91 having a relatively large transmitting surface. Compared to a wire antenna described in the prior art section, the planar antenna has a large transmitting surface for its size. Thus, the size of the transmitter 30 is reduced while improving the transmission performance of the transmission antenna 34.

(2) The transmission antenna 34 is parallel to the circuit substrate 81. The transmission antenna 34 and the circuit board 81 are both shaped as a relatively thin plate. Since such plate-like members (34, 81) are parallel to each other, the space occupied by the transmission antenna 34 and the circuit board 81 is minimized. This permits the size casing 70, or the size of the transmitter 30, to be reduced.

(3) The transmission antenna 34 is configured such that radio waves with circular polarization are transmitted. A circularly polarized wave is the resultant of a vertically polarized wave and a horizontally polarized wave with a 90 degree phase difference. As the circularly polarized wave advances, the plane of polarization rotates. Application of the transmission antenna 34 capable of transmitting circularly polarized waves to the transmitter 30 of a tire condition monitoring apparatus is significantly advantageous.

That is, the reception antenna 41 is fixed to a predetermined part of the vehicle body frame 11, while the transmission antenna 34 of each transmitter 30, which is attached to the associated wheel 21, rotates with the wheel 21. Therefore, the orientation of the transmission antenna 34 relative to the reception antenna 41 changes as the wheel 21 rotates.

The wire antenna mentioned in the prior art section is a linear polarized antenna that transmits a linear polarized wave (horizontally polarized waves or vertically polarized waves). The orientation of the plane of polarization of transmitted waves is always the same. In a case where such a linear polarized antenna is used as a transmission antenna, the orientation of the plane of polarization of radio waves received by the reception antenna changes in accordance with changes in the orientation of the transmission antenna as the wheel rotates. As a result, the intensity of radio waves received by the reception antenna is significantly reduced at a certain rotational angle position of the wheel, which hampers reliable reception.

In contrast to this, the transmission antenna 34 of the present embodiment is a circular polarized antenna that transmits circularly polarized waves. The transmission antenna 34 rotates such that the orientation of the polarization plane of transmitted radio waves constantly changes. Therefore, even if the intensity of received radio wave is reduced due to the displacement of the polarization planes between the transmitting side and the receiving side when the wheel 21 is at a certain rotational angle position, the orientation of the polarization plane of the radio wave received by the reception antenna 41 will have been changed when the wheel 21 reaches the same rotational angle position next time. Thus, the intensity of the received antenna is prevented from being reduced at the certain rotational angle position of the wheel 21. That is, even if the intensity of the received radio wave is insufficient when the wheel 21 is at a certain rotational angle position, it is highly likely that the intensity of the received radio wave will be sufficient when the wheel 21 reaches the same rotational angle position next time. This increases the possibility of a reliable reception. Therefore, irrespective of changes in the orientation of the transmission antenna 34 due to rotation of the wheel 21, stable reception is performed.

(4) Since a material having a wavelength shortening property is used for the antenna substrate 90, the size of the transmission conductor 91 is reduced. Accordingly, the size of the transmission antenna 34 is reduced. As a result, the size of the transmitter 30 is further reduced.

(5) In addition to a property to shorten wavelength as described above, a dielectric has a property to reflect and refract radio waves. In this embodiment, the antenna substrate 90 formed of dielectric is located between the metal wheel 21 and the transmission conductor 91. This configuration reduces the component of radio waves that reaches the wheel 21 from the transmission conductor 91, thereby amplifying the component of radio waves that advances to the opposite side of the wheel 21 from the transmission conductor 91, or advances radially outward. That is, by appropriately setting the characteristics, such as the dielectric constant, the shape, and the size of the antenna 90, the influence of the metal wheel 21 to the radio waves transmitted by the transmission conductor 91 is minimized.

The above embodiment may be modified as follows.

Figure 6:
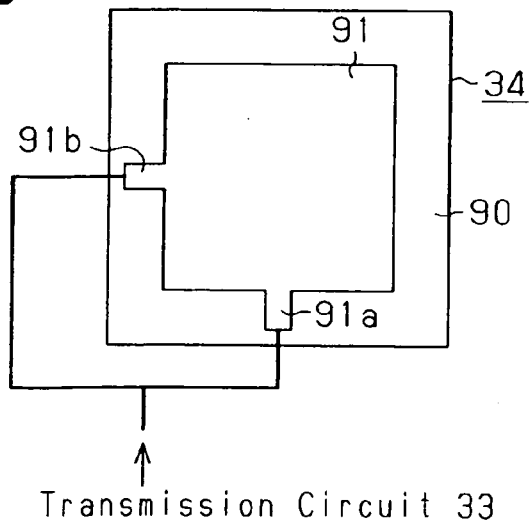
FIG. 6 is a plan view illustrating a transmission antennal according to a modified embodiment.

As shown in FIG. 6, the transmission conductor 91 may be rectangular. As in the embodiment of FIG. 5, a dual feed system is adopted in the modified embodiment of FIG. 6.

Figure 7:
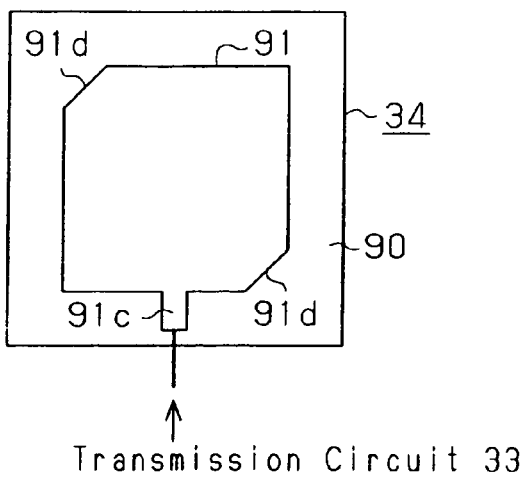
FIG. 7 is a plan view illustrating a transmission antennal according to a modified embodiment.
Figure 8:
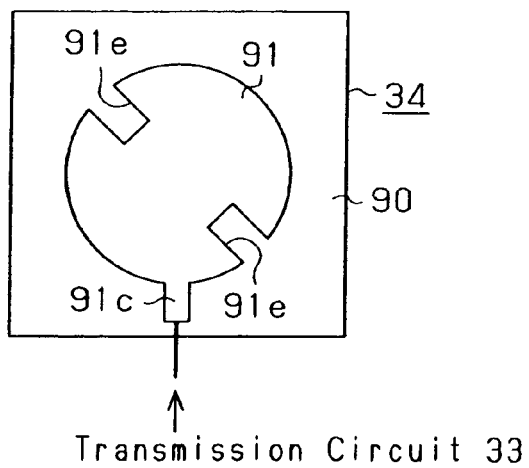
FIG. 8 is a plan view illustrating a transmission antennal according to a modified embodiment.
Figure 9:
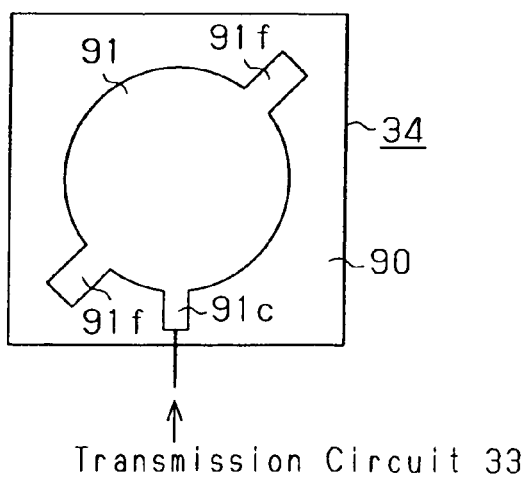
FIG. 9 is a plan view illustrating a transmission antennal according to a modified embodiment.

As shown in FIGS. 7 to 9, a single feed system may be adopted as the system for generating circularly polarized waves. In the modified embodiment of FIG. 7, a transmission conductor 91 having a single feeder terminal (microstrip line) 91c is used. Chamfered portions 91d are formed at diagonally positioned two of the corners of the transmission conductor 91.

In the modified embodiment of FIG. 8, a circular transmission conductor 91 is used. A pair of notches 91e are formed in the peripheral portion of the transmission conductor 91 at an interval of 180 degrees.

In the modified embodiment of FIG. 9, a circular transmission conductor 91 is used as in the modified embodiment of FIG. 8. A pair of projections 91f extending radially outward are formed in the peripheral portion of the transmission conductor 91 at an interval of 180 degrees.

When a single feed system is adopted, the transmission circuit 33 does not need to have a phase control circuit. This simplifies the circuit configuration.

In the illustrated embodiments, electricity is supplied to the transmission conductor 91 through microstrip lines, which are conductor traces formed on the antenna substrate 90. Unlike the illustrated embodiments, electricity may be supplied to the transmission conductor 91 through supply lines that extend through the antenna substrate 90.

In the illustrated embodiments, the four reception antennas 41 are provided, and each antenna 41 corresponds to one of the tires 20. However, the number of the reception antennas 41 does not need to match the number of the tires 20 as long as at least one reception antenna 41 is provided.

In addition to or instead of the pressure sensors 32 functioning as tire condition sensors, temperature sensors for detecting the temperature in the tires 20 may be provided.

Therefore, the present examples and embodiments are to be considered as illustrative and not restrictive and the invention is not to be limited to the details given herein, but may be modified within the scope and equivalence of the appended claims.

The invention claimed is:

1. A transmitter for an apparatus for monitoring a condition of a tire of a vehicle, comprising:
    a tire condition sensor for detecting the condition of the tire;
    a transmission circuit, wherein the transmission circuit generates a transmission signal containing data that represents the detected tire condition; and
    a transmission antenna that transmits the transmission signal as a radio wave, wherein the transmission antenna is a planar antenna that includes a plate-like transmission conductor for transmitting the radio wave and is configured such that the radio wave transmitted from the transmission conductor becomes a circularly polarized wave.

2. The transmitter according to claim 1, wherein the transmission antenna includes:
    an antenna substrate having opposite first and second surfaces;
    the transmission conductor located on the first surface of the antenna substrate; and a grounding conductor located on the second surface of the antenna substrate.

3. The transmitter according to claim 2, wherein the antenna substrate is made of a dielectric.

4. The transmitter according to claim 3, the transmitter being attached to a wheel of the vehicle to face a circumferential surface of the wheel, wherein, when the transmitter is attached to the wheel, the antenna substrate is located between the circumferential surface of the wheel and the transmission conductor.

5. The transmitter according to claim 2, further comprising a circuit board on which the tire condition sensor and the transmission circuit are mounted, wherein the transmission antenna is arranged to be parallel to the circuit board.

6. The transmitter according to claim 5, the transmitter being attached to a wheel of the vehicle to face a circumferential surface of the wheel, wherein, when the transmitter is attached to the wheel, the transmission antenna is arranged outside of the circuit board with respect to a radial direction of the wheel.

7. A transmitter for an apparatus for monitoring a condition of a tire of a vehicle, comprising:
- a tire condition sensor for detecting the condition of the tire;
- a transmission circuit, wherein the transmission circuit generates a transmission signal containing data that represents the detected tire condition; and
- a planar transmission antenna that transmits the transmission signal as a radio wave, the transmission antenna including:
  - an antenna substrate having opposite first and second surfaces;
  - a plate-like transmission conductor for transmitting the radio wave, the transmission conductor being located on the first surface of the antenna substrate; and
  - a grounding conductor located on the second surface of the antenna substrate,
- wherein the transmission antenna is configured such that the radio wave transmitted from the transmission conductor becomes a circularly polarized wave.

8. The transmitter according to claim 7, wherein the antenna substrate is made of a dielectric.

9. The transmitter according to claim 8, the transmitter being attached to a wheel of the vehicle to face a circumferential surface of the wheel, wherein, when the transmitter is attached to the wheel, the antenna substrate is located between the circumferential surface of the wheel and the transmission conductor.

10. The transmitter according to claim 7, further comprising a circuit board on which the tire condition sensor and the transmission circuit are mounted, wherein the transmission antenna is arranged to be parallel to the circuit board.

* * * * *